(12) United States Patent
Gloss et al.

(10) Patent No.: US 11,021,097 B2
(45) Date of Patent: Jun. 1, 2021

(54) IMAGE PROJECTION MODULE OF A VEHICLE AND A THICK LENS THEREFOR

(71) Applicant: Varroc Lighting Systems, s.r.o., Senov u Noveho Jicina (CZ)

(72) Inventors: Tomas Gloss, Vitkov (CZ); Jakub Hruska, Hlucin (CZ)

(73) Assignee: VARROC LIGHTING SYSTEMS, S.R.O.

( * ) Notice: Subject to any disclaimer, the term of this patent is extended or adjusted under 35 U.S.C. 154(b) by 0 days.

(21) Appl. No.: 16/882,796

(22) Filed: May 26, 2020

(65) Prior Publication Data
US 2020/0377006 A1   Dec. 3, 2020

(30) Foreign Application Priority Data
May 28, 2019   (CZ) .............................. PV 2019-329

(51) Int. Cl.
*B60Q 1/24*   (2006.01)
*F21S 43/20*   (2018.01)
*F21W 103/60*   (2018.01)

(52) U.S. Cl.
CPC ................ *B60Q 1/24* (2013.01); *F21S 43/26* (2018.01); *F21W 2103/60* (2018.01)

(58) Field of Classification Search
None
See application file for complete search history.

(56) References Cited

U.S. PATENT DOCUMENTS

| | | |
|---|---|---|
| 2016/0109709 A1* | 4/2016 | Osterhout ............... G06F 3/013 359/614 |
| 2017/0068087 A1 | 3/2017 | Uemura et al. |
| 2017/0246983 A1 | 8/2017 | Canonne et al. |
| 2018/0118099 A1 | 5/2018 | Kunii et al. |

FOREIGN PATENT DOCUMENTS

JP   2015-132707 A   7/2015

* cited by examiner

*Primary Examiner* — Ashok Patel
(74) *Attorney, Agent, or Firm* — Ostrolenk Faber LLP

(57) ABSTRACT

An image projection module of a vehicle that includes a light source directed to a projection mask and through it to output optics which is adapted to direct the projected light onto a road near the vehicle. The projection mask is formed on a front wall of a thick lens, whereby this front wall is adapted to direct the projected light from the light source to a flat upper wall of the thick lens which is adapted to totally reflect the projected light onto a curved output wall of the thick lens which is adapted to emit the projected light onto the road into the desired form of the projected pattern. A thick lens for an image projection module of a vehicle.

12 Claims, 4 Drawing Sheets

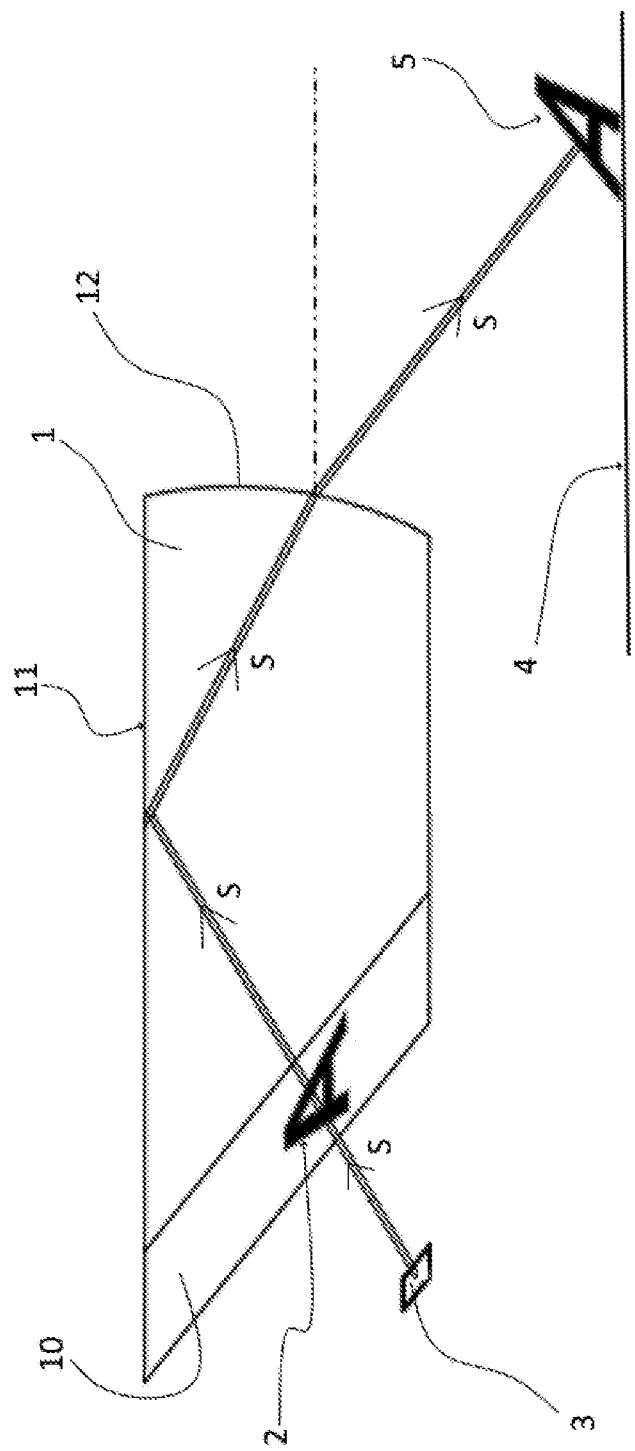

IMAGE PROJECTION MODULE OF A
VEHICLE AND A THICK LENS THEREFOR

TECHNICAL FIELD

The invention relates to an image projection module of a vehicle which comprises a light source directed to a projection mask and through it to output optics which is adapted to direct the projected light on a road surface near the vehicle.

The invention also relates to a thick lens for the image projection module of a vehicle.

BACKGROUND ART

Projecting warning/informative signals on a road or near the vehicle, especially from a rear lamp, is known from numerous documents, e.g. JP 2015 132 707 A, US 2017 068 087 A1, US 2017 246 983 A1 and US 2018 118 099 A1.

Also known is a device shown in FIG. 0, which is designed to project a single pattern, e.g. a logo, on a road surface near a vehicle, e.g. when the vehicle door is opened, which is based on the fact that light from a light source (LED) is guided through a collecting lens which directs the light from the light source onto a mask arranged further. The mask consists of a transparent or translucent part with a shaped absorbent (black) imprint on a portion of its surface, whereby the unprinted portion of the mask surface forms the shape of a projected pattern which transmits light from the light source further onto a projection lens (or a group of lenses) by which the pattern is directed onto the road surface near the vehicle. Thus, the projection lens is an optical element which displays the mask positioned at the focal point of the projection lens in an imaging plane, i.e., on the road, thereby projecting a specific pattern, such as a logo, onto the road surface.

The disadvantage of this solution is that it is primarily intended to be placed in a vehicle door in a vertical downward direction, from where it projects a fixed pattern onto the road surface perpendicularly down to the road plane. If this module were to be used in a different position, for example in a position to project an image from a rear lamp onto the road at a certain distance from the vehicle (beyond the vehicle), this projection module would have to be slanted downwards and consequently it would occupy more space than is required for efficient use of the lamp interior. Another disadvantage of this arrangement is that it usually consists of several optical components, which increases the difficulty of assembling the lamp and also the difficulty of positioning the individual parts relative to each other in order to ensure the correct position of all optical components relative to each other.

The object of the invention is to eliminate or at least minimize the disadvantages of the background art in the field of projecting one specific pattern onto a road surface.

PRINCIPLE OF THE INVENTION

The object of the invention is achieved by an image projection module of a vehicle, whose principle consists in that a projection mask is formed on a front wall of a thick lens, this front wall being adapted to direct light projected from a light source onto a flat upper wall of the thick lens which is adapted to totally reflect the projected light onto a curved output wall of the thick lens which is adapted to emit the projected light onto a road surface into the desired form of the projected image.

The advantage of this arrangement is a significant amount of space saved in the vertical direction for creating an image projection device which is situated substantially horizontally but which projects the desired pattern downwards onto the road surface near the vehicle, which allows to integrate this image projection module into a rear lamp of the vehicle and reduce the number of the optical parts.

In terms of durability and simplicity, it is advantageous if the projection mask consists of an absorbent layer having a light transmissive portion in the shape of the projected image.

From a manufacturing point of view, it is advantageous if the thick lens is a prismatic body, one face of which is inclined and constitutes an inclined input wall of the thick lens, wherein the other face of the prismatic body is shaped and constitutes an output wall of the thick lens and a flat upper wall is arranged between these walls. Such a body can be produced in high quality by mass production, for example by injection molding of optical plastic.

In order to improve the homogeneity of the mask illumination and at the same time to improve the light efficiency of the image projection module, it is advantageous if a collecting lens is arranged between the light source and the inclined input wall of the thick lens.

In order to make the mounting and adjustment operations less demanding, it is advantageous if the collecting lens is mechanically connected to the body of the thick lens.

From a manufacturing point of view, it is advantageous if the collecting lens is connected to the body of the thick lens by means of an upper arm to form a single indivisible unit which can be mass-produced in high quality, for example by injection molding of optical plastic.

The principle of the thick lens for an image projection module of a vehicle consists in that the thick lens is formed by a prismatic body, one face of which is inclined and constitutes an inclined input wall of the thick lens, whereas the other face of the prismatic body is shaped and constitutes an output wall of the thick lens and a flat upper wall is arranged between these walls.

In order to improve the homogeneity of the mask illumination and at the same time to improve light efficiency, it is advantageous to arrange the collecting lens in front of the inclined input wall of the thick lens.

In order to make the mounting and adjustment operations less demanding, it is advantageous if the collecting lens is mechanically connected to the thick lens body.

From a manufacturing point of view, it is advantageous if the collecting lens is connected to the body of the thick lens by means of an upper arm to form a single indivisible unit which can be can be mass-produced in high quality, for example by injection molding of optical plastic.

DESCRIPTION OF THE DRAWINGS

The invention is schematically represented in a drawing, wherein

FIG. 5 is a perspective view of the function the embodiment of the invention with the thick lens of FIG. 1.

EXAMPLES OF EMBODIMENT

Figure 1:
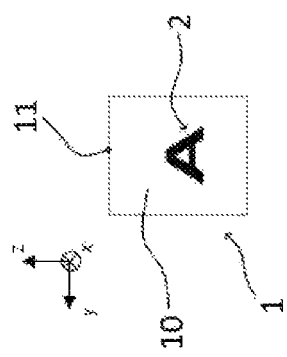
FIG. 1 shows a front view of a thick lens of a first exemplary embodiment.
Figure 2:
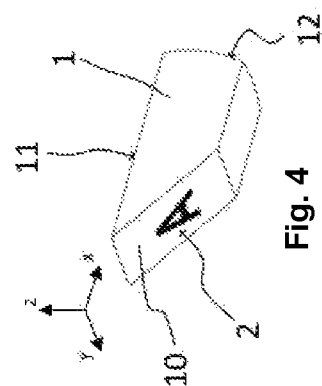
FIG. 2 shows a view of the thick lens of FIG. 1 in the direction of the axis X.
Figure 3:
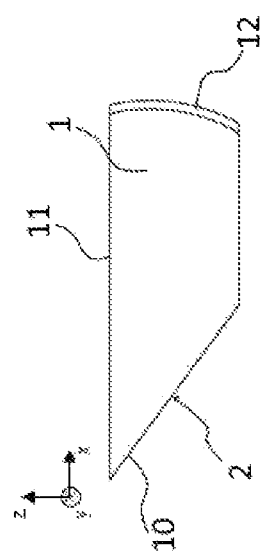
FIG. 3 shows a bottom view of the thick lens of FIG. 1.
Figure 4:
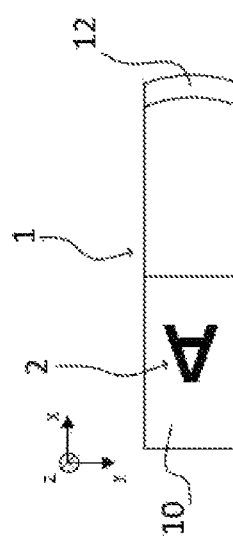
FIG. 4 shows a perspective view of the thick lens of FIG. 1.
Figure 7:
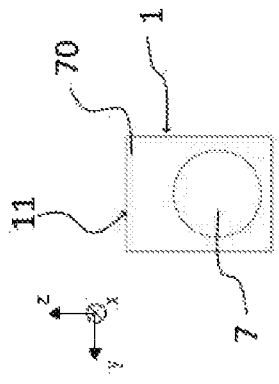
FIG. 7 shows a view of the thick lens of FIG. 6 in the direction of the axis X.
Figure 6:
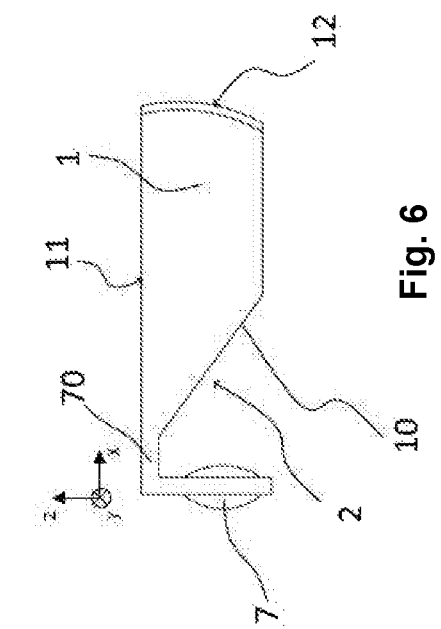
FIG. 6 is a front view of a thick lens according to a second exemplary embodiment.
Figure 9:
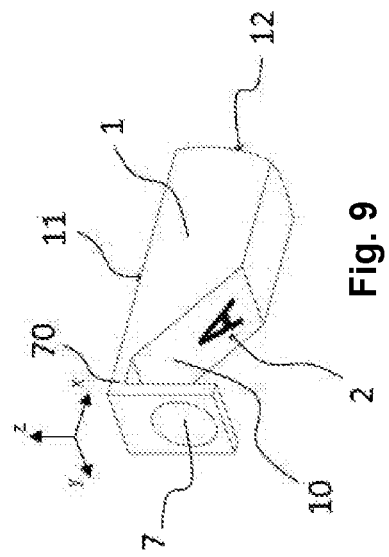
FIG. 9 is a perspective view of the thick lens of FIG. 6.
Figure 8:
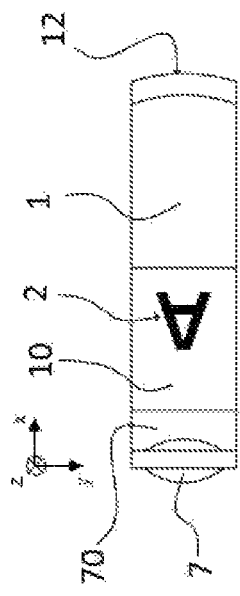
FIG. 8 is a bottom view of the thick lens of FIG. 6.

The invention will be described on an image projection module of a vehicle with a thick lens 1 in the form of a thick-walled lens with an input wall 10 provided with a projection mask 2 which projects light S from a light source 3 upwards onto a flat upper wall 11 of the thick lens 1 from which the projected light S is totally reflected downwards onto a curved output wall 12 of the thick lens 1 which further directs the projected light S downwards onto a road 4 into the desired form of the projected pattern 5. The output wall 12 of the thick lens 1 substantially constitutes a projection lens of the image projection module. The flat upper wall 11 is in principle arranged between the input wall 10 of the thick lens 1 and the output wall 12 of the thick lens 1.

The light source 3 is, for example, formed by a light-emitting diode (LED) or another suitable light source certified for use in the sphere of means of transport.

The projection mask 2 consists, for example, of an absorbent layer, i.e., a light-transmissive layer, a portion of which in the shape of the projected pattern 5, that is, the pattern 5 to be projected on the road 4 near the vehicle, is removed, for example, by a laser. Thus, the projection mask 2 is substantially a negative of the projected pattern 5. To make this completely clear, the projection mask 2 and the projected pattern 5 on the road 4 are shown in the illustrated embodiment for illustrative purposes only. Indeed, if the projected pattern 5 is to be formed by a light field, i.e. by an area limited light stream forming an illuminated sign/symbol on the road surface 4 (pattern 5), then the projection mask 2 must be formed as an opaque surface in which its part corresponding to the projected pattern 5 is removed, that is, the inclined front wall 10 would be in FIG. 5 "all dark" (as opposed to FIG. 5) and only its portion corresponding to the projected pattern 5 would be "white" (as opposed to FIG. 5).

In the embodiment of FIG. 5, the light source 3 is directed onto the inclined input wall 10 of the thick lens 1 of FIGS. 1 to 4, wherein this inclined front wall 10 is by its surface shape and inclination adapted to direct the light S projected from the light source 3 onto the flat (planar) upper wall 11 of the thick lens 1. The projected light S is totally reflected from the flat (planar) upper wall 11 of the thick lens 1 onto the curved output wall 12 of the thick lens 1 which further directs the projected light S onto the road 4 into the desired from of the projected pattern 5.

The thick lens 1 of FIGS. 1 to 4 is formed by a prismatic body one face of which is inclined and constitutes an inclined input wall 10 of the thick lens 1, whereby the other face of this prismatic body is shaped and constitutes an output wall 12 of the thick lens 1.

Figure 10:
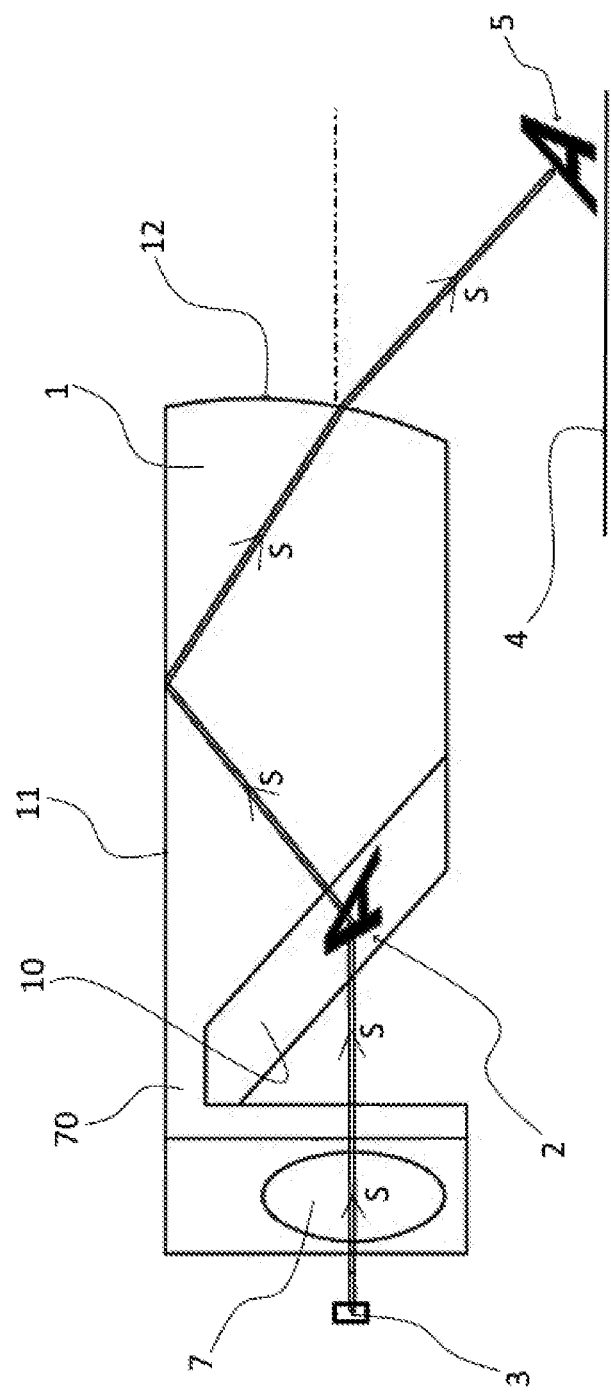
FIG. 10 shows a perspective view of the function the embodiments of the invention with the thick lens of FIG. 6.

In the embodiment of FIG. 10, a collecting lens 7 is arranged between the light source 3 and the inclined input wall 10 of the thick lens 1. The collecting lens 7 is adapted to improve efficiency and uniformity of the illumination of the inclined input wall 10 of the thick lens 1 provided with a projection mask 2, thereby increasing the luminous efficiency of the vehicle image projection module. In the exemplary embodiment shown in FIGS. 6 to 9, the collecting lens 7 is mechanically connected to the body of the thick lens 1 by an upper arm 70 according to the embodiment of FIGS. 1 to 4, and is thus an integral part thereof, thereby ensuring the spatial and directional certainty of the relationship of the collecting lens 7 and the thick lens 1. The thus formed assembly of the collecting lens 7 and of the thick lens 1 is also relatively easy to manufacture as one piece, e.g. by injection molding of optical plastic, without the need for additional positioning of both parts relative to each other. In an unillustrated exemplary embodiment, the assembly of the collecting lens 7 and of the thick lens 1 is connected in another appropriate manner into one body of mutually positioned and directionally oriented parts. In another unillustrated exemplary embodiment, the collecting lens 7 is formed by a separate body which is arranged in the desired position and orientation between the light source 3 and the thick lens 1. In this case, however, the need arises to ensure additionally the mutual position and direction of the light source 3, the collecting lens 7 and the thick lens 1 in the image projection module assembly of the vehicle.

The invention claimed is:

1. An image projection module of a vehicle comprising a light source directed onto a projection mask and through the projection mask onto output optics adapted to direct projected light to a road near the vehicle, the optics comprising a thick lens having a front wall, a flat upper wall and a curved output wall;

the projection mask is formed on the front wall of the thick lens, such that the front wall is adapted to receive and direct the projected light from the light source through the front wall of the thick lens and through the thick lens to an underside of the flat upper wall of the thick lens wherein the flat upper wall totally reflects the projected light through the thick lens and through a curved output wall of the thick lens and the thick lens and the curved output wall are adapted to emit the projected light through the curved output wall of the thick lens onto the road into a selected form of a projected pattern;

the front wall is inclined with respect to the thick lens in a direction such that light from the light source is directed by the mask on the front wall and directed by the front wall to be projected on the flat upper wall of the thick lens at an angle that causes the light projected onto the underside of the flat upper wall to be redirected at a downward incline to the curved output wall.

2. The image projection module of a vehicle according to claim 1, wherein the projection mask comprises a light absorbent layer also comprises a light-transmitting portion in the form of the projected pattern.

3. The image projection module of a vehicle according to claim 1, wherein the thick lens is formed of a prismatic body, one face of the prismatic body is inclined and constitutes an inclined front wall of the thick lens, whereas another face of the prismatic body is shaped and comprises an output wall of the thick lens and the flat upper wall is arranged between the inclined front wall and the output wall.

4. The image projection module of a vehicle according to claim 1, wherein a projected light collecting lens is arranged between the light source and the inclined front wall of the thick lens.

5. The image projection module of a vehicle according to claim 4, wherein the collecting lens is mechanically connected to the body of the thick lens.

6. The image projection module of a vehicle according to claim 5, wherein the collecting lens is connected to the body of the thick lens by an upper arm to form one indivisible unit between the body of the thick lens and the upper arm.

7. A thick lens for the image projection module of a vehicle according to claim 1, wherein the thick lens is comprised of a prismatic body having one inclined face which constitutes an inclined front wall of the thick lens, whereas another face of the prismatic body is shaped and constitutes the output wall of the thick lens and the flat upper wall is arranged between the inclined front wall and the output wall.

8. The thick lens according to claim 7, wherein a collecting lens is arranged in front of the inclined front wall of the thick lens.

9. The thick lens of a vehicle according to claim 8, wherein the collecting lens is mechanically connected to the body of the thick lens.

10. The thick lens of a vehicle according to claim 9, wherein the collecting lens is connected to the thick lens by an upper arm to form one indivisible unit between the body of the thick lens and the upper arm.

11. The image projection module of a vehicle according to claim 1, wherein the entire projection module from the front wall, past the upper wall and through the curved output wall extends on a single direction axis, and the inclined front wall directs light from the light source into the thick lens, wherein the thick lens includes and is there defined by an upper wall that reflects light entering the thick lens from the front wall to the upper wall, and the upper wall reflects the light through the curved output wall, such that the light travels a path in the thick lens that is not parallel to the axis of the thick lens.

12. The image projection module according to claim 11, wherein the thick lens is a solid cylindrical shape body from the inclined front wall to the curved output wall, without a bend along the thick lens or the axis of the thick lens.

* * * * *